Nov. 18, 1952 V. H. HAY ET AL 2,618,693
IGNITION SWITCH CONTROLLED SAFETY DEVICE
Filed Aug. 3, 1951 2 SHEETS—SHEET 1

Vernon H. Hay
Wyatt J. Armfield
INVENTORS

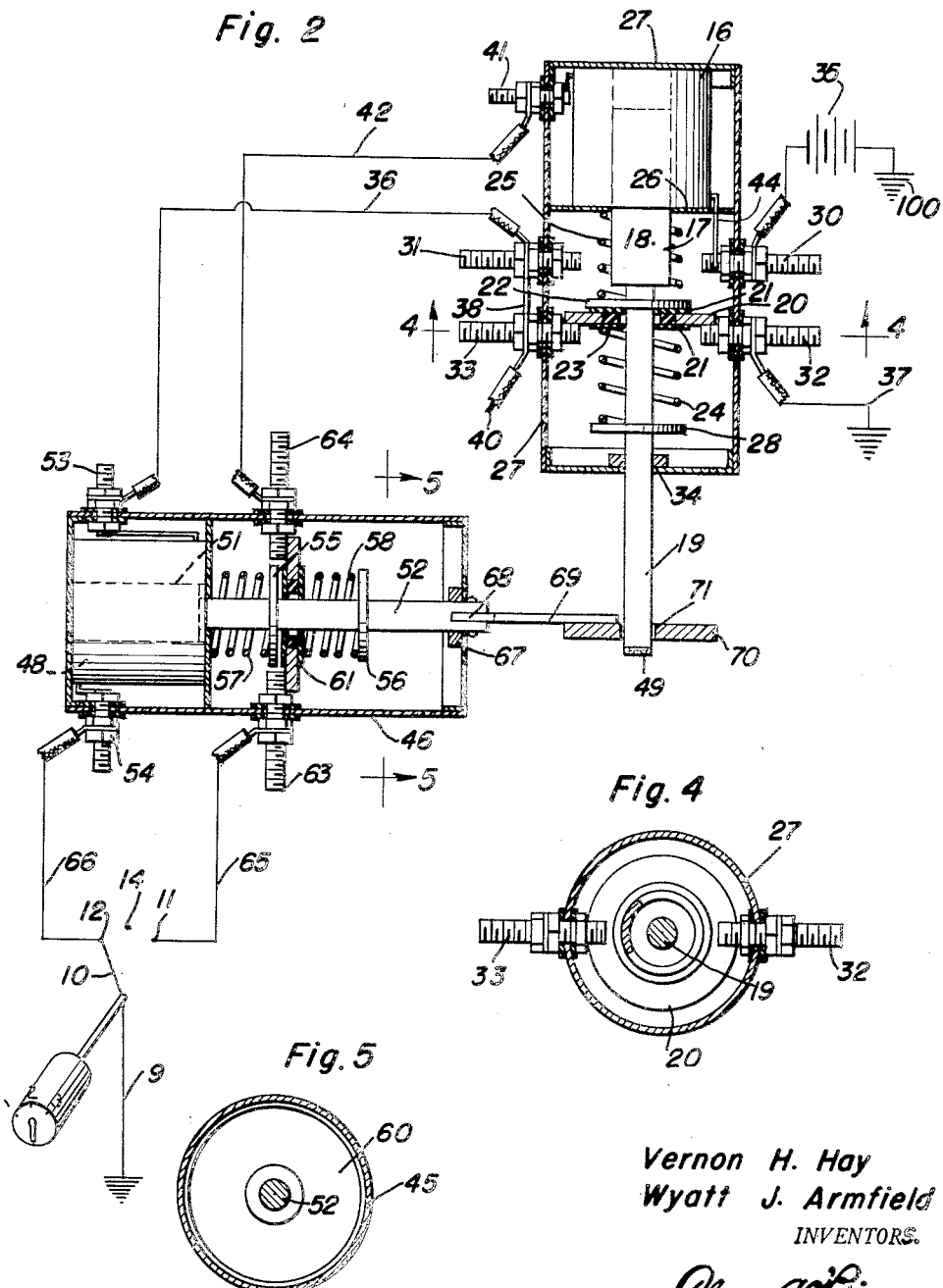

Patented Nov. 18, 1952

2,618,693

UNITED STATES PATENT OFFICE 2,618,693

IGNITION SWITCH CONTROLLED SAFETY DEVICE

Vernon H. Hay and Wyatt J. Armfield, Concord, N. C.

Application August 3, 1951, Serial No. 240,260

2 Claims. (Cl. 175—375)

This invention relates to electrical safety switches and more particularly to safety switches for automobiles, airplanes, and other self-propelled vehicles and it has for a general object to provide a switch of the type generally termed a master switch, controlling all the connections with current consuming units of an automobile or other self-propelled vehicle with a source of current which is automatically operable upon operation of the ignition switch and which may be locked in the position adopted without any current consumption during the time in which the said master switch remains locked.

A further object of the invention consists in providing locking means for locking the switch in one of its positions without current consumption and in such a manner that the lock may be released by the operation of the ignition switch.

Further and more specific objects will be stated below in detail.

Master safety switches for automobiles, airplanes and other vehicles cutting off all connections between the source of current and all or any of the circuits of the vehicles to reduce fire hazard are well known in the art. They are usually operated by hand or they may be operated automatically under certain conditions occurring during the operation of the vehicle or during accidents, for instance by gravity, deceleration or the like. Further it is known to operate such a master switch indirectly by operation of the ignition switch, the master switch being turned on when the ignition switch is turned on and being turned off when the ignition switch is turned off. This connection may either be a mechanical or an electrical connection. A mechanical connection between the ignition switch and the master switch has the advantage that it does not entail current consumption, but it is always difficult to produce and unreliable to a certain extent, as the ignition switch must be located on the dashboard of the vehicle and the master switch should be arranged as closely as possible to the battery. If so located a long connection which is far from being straight and which therefore has much friction is necessary which connection entails the application of some force and is not fully reliable and positive in its action on account of the imperfect mechanical connection. It is also rarely fully locked against accidental operation. An electrical connection between the ignition switch and the master switch is therefore preferable, but it is always current consuming also during the periods of rest, as the switch must be locked. Either the switch itself or a locking device must be supplied with electrical energy to maintain the master switch in its locked position.

According to the invention the connection between the ignition switch and the master switch is electrical, but the master switch comprises not only a switching device but also a locking device cooperating in such manner with the switching device and so interlocked with it that the locking operation of the master switch is performed by mechanical means which are controlled by a locking solenoid. The latter however becomes automatically de-energized with the locking device, remaining operative as long as the master switch has adopted its desired position. For unlocking it is necessary to energize the locking device which then unlocks the switching device, but also turns it off, this turning off of the switching device also de-energizing the locking device and locking it mechanically.

It will thus be seen that the master switch and its switching and locking devices draw only current while one of them is engaged or disengaged while no current is drawn permanently. On the other hand both devices are safely locked in their position and cannot adopt any position other than that prescribed, as is frequently the case with mechanically operated locking means which are moved accidentally to an intermediate position or which get stuck in such a position.

The invention has been described with reference to the accompanying drawings showing one embodiment thereof. It is however to be understood that the embodiment shown in the drawing by way of example has been selected in order to explain the principle of the invention and the best mode of applying said principle. A modification of the example shown may obviously be made without departing from the principle of the invention and therefore such modifications are not necessarily a deviation from the essence of the invention.

In the drawing:

Figure 2 is a similar view showing the master switch in another position;

Figure 4 is a sectional plan view, the section being taken along line 4—4 of Figure 2;

Figure 5 is an elevational side view the section being taken along line 5—5 of Figure 2.

Figures 1, 3:
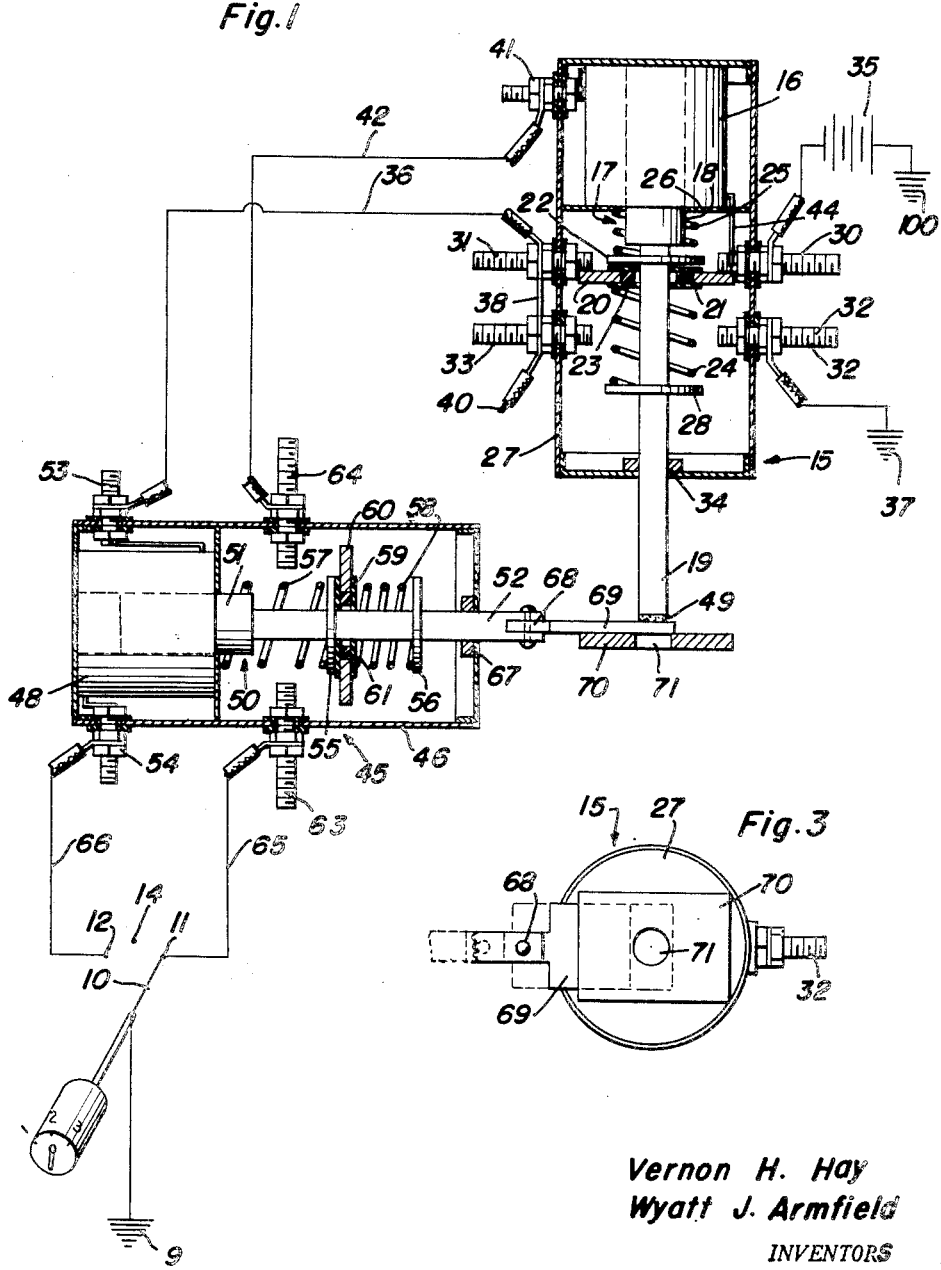
Figure 1 is a diagrammatic sectional and elevational view of a master switch according to the invention, the figure showing the devices in their locked position.
Figure 3 is an end view of the switching device and of the adjoining part of the locking device.

The safety switch is shown in the drawings in two characteristic positions. In the drawing 10 indicates the ignition switch which in this case is so constructed that it may adopt three different positions. In the first position or off position both the ignition switch and the master switch are turned off. In the second position the ignition switch is turned off, while the master switch is on. In this position the key can be removed so that the circuits of the parking lights or of other lights remain on and merely the ignition is turned off. In a third position of the ignition switch both the ignition switch and the master switch are turned on.

These positions are merely diagrammatically indicated in the drawing the three positions of the ignition switch being marked 1, 2, 3, while the contacts of the ignition switch with the connections leading to the master switch device are indicated at 11 and 12.

The master switch as seen in Figures 1 and 2 comprises a main switching device 15 which includes a solenoid 16 operating a plunger 17 which consists of a solenoid core 18 and a contact supporting plunger rod 19. The plunger rod of the switching device is equipped with contacts capable of carrying heavy currents. This contact device preferably consists of a loosely mounted annular disk 20 which may be provided with a central insulating ring 23 and which is held between insulating washers 21 and pressed against a further or intermediate disk 22 by means of a coil spring 24. The disk 22 in its turn is under pressure of a further coil spring 25 which is supported on a plate 26 fixedly mounted in the casing 27 surrounding the entire switching device 15. The coil spring 24 is held by a retainer disk 28 fixedly held on the plunger rod 19.

The contact 20 is thus held between springs 24 and 25 and therefore is always pressed against the fixed contacts under heavy elastic pressure, whatever the position to which the rod 19 and the core 18 is moved.

The plunger rod 19 passes to the outside through a suitable opening in the casing 27 surrounded by a guide piece 34 which guides the said rod. The outward movement of the plunger rod may either be allowed or may be prevented by a locking means as described below.

The fixed contacts of the switching device 15 are formed by the bolts 30, 31, 32, 33 of terminal screws which are mounted on the casing 27 and are insulated therefrom by insulated washers. The bolts partly project into the casing and are so arranged that bolts 30, 31 and the bolts 32, 33 will come into contact with the contact disk 20 simultaneously in each position of the disk, good contact with both bolt ends being maintained by the springs.

The contact terminal 30 is connected with a grounded battery 35, while the second contact terminal 31 cooperating with it, is connected with a conductor 36 leading to the ignition switch 10 over the locking solenoid to be described below.

It will be clear that in the position of the plunger 17, shown in Figure 1, the contacts 30, 31 are bridged by the annular disk 20 so that the conductor 36 is under current. The contact terminal 32 which is connected with the contact terminal 33 by the disk when the plunger 17 moves down, is grounded at 37 for a purpose described below, while contact terminal 33 is connected with contact terminal 31 of the second set of contacts by means of conductor 38. The contact terminal 33 is moreover connected with a load circuit 40, as indicated in Figures 1 and 2. Therefore, when the disk 20 is in its operative position the load circuit 40 is connected with the battery or source of current 35 over the contacts 30 and 31, the lead 38 and the terminal 33. The load circuit, on the other hand, and especially the generator circuit, is however grounded at 37 when the contact disk 20 is in its position of rest or inoperative position. This prevents the burning out of lights when the motor and generator is still running at high speed while the switch is thrown.

It will be clear that the plunger rod 19 is normally moved outwardly by the tension of the springs 24, 25. It is pulled inwardly by the solenoid 16 acting on the core 18 which is energized by means of the terminal 41 mounted in the casing 27 and connected with conductor 42. The other side of the solenoid winding is connected by means of a connecting wire 44 with the contact terminal 30 which, as above described, is joined to the battery 35. Obviously when the solenoid 16 is energized the plunger rod 19 is moved inwardly against the tension of the springs 24 and 25.

The locking device 45 of the master switch comprises a casing 46 housing a solenoid 48 which operates a plunger 50. The plunger consists of a core member 51 and a plunger rod 52. The solenoid is connected with two terminals 53, 54 which are mounted in the casing 46 but are insulated therefrom. These terminals are connected with conductors 36 and 66 respectively, which lead to terminals 31 and 33 of the switching device and to the ignition switch respectively. The plunger rod 52 carries two fixed disks 55, 56, the former being under the tension of spring 57 moving the plunger rod outwardly. An annular disk 60 which may carry an insulating ring 61 in the center, is inserted between the two fixed disks 55, 56 and is pressed towards the former by a spring 58 which, at its other end, is pressed against the disk 56. On both ends of the contact disk 60 insulating washers may be arranged to prevent contact of the disk with other metallic parts.

The disk cooperates with the two contacts 63, 64 formed by contact bolts passing through the casing 46 but insulated therefrom. The bolts are held by suitable nuts and are provided with further nuts for clamping the wires attached to them. The outwardly projecting ends of the bolts 63, 64 form terminals which are connected with conductors 65 and 42 respectively leading to the ignition switch and to the terminal 41 of the switching device, respectively.

The plunger rod passes through an opening in the casing 46 to the outside and may be guided during its passage through said opening by a guide piece 67 attached to the casing. The plunger rod 52 is provided with a forked end carrying a pivot connection 68 at which the locking plate 69 is pivoted to the rod. The locking plate 69 may be moved over a second perforated plate 70 which is provided with a circular bore or hole 71, the latter being located in the path of the plunger rod 19 of the main switching device 15. The perforated plate 70 is so arranged that the axis of the plunger rod 19 coincides with the axis of the circular hole or bore 71.

The locking plate 69 is so positioned that it covers the hole 71 when the plunger rod 52 has been moved outwardly, so that the head 49 of the plunger rod 19 comes to rest on said locking plate 69 and is held in a position in which plunger rod is withdrawn to the largest possible extent. Thus, the plunger rod 19 is prevented from moving outwardly as long as the locking plate 69 covers the opening 71 and forms a rest for the head 49 of the plunger rod. When the locking plate 69 is withdrawn however, the plunger rod 19 may freely move through the hole or bore 71 until the disk 20 comes to rest against the contacts 32, 33.

The operation of the device will be readily understood from the above description. Let it be assumed that the plunger rod 52 has been withdrawn inwardly and therefore has also withdrawn the locking plate inwardly, so that the opening 71 is now uncovered and the plunger rod 19 may therefore pass through this opening. The contact disk 20 of device 15 in this case rests on the two contacts 32, 33 and the contact disk 60 of the locking device 45 rests on the contacts 63, 64. This position is shown in Figure 2. All the circuits are now grounded including the circuit 65, 36 of solenoid 48 and the load circuit 46. The battery is disconnected from the load circuits. It will be observed that the springs 57 of locking device 45 would in this case tend to move the plunger rod 52 and the locking plate 69 outwardly, but the plunger rod 52 in this case is prevented from moving in this direction, because the locking plate 69 abuts against plunger rod 19 thus preventing this movement.

Let it be further assumed that now the master switch is to be thrown into its operative or "on" position, because the car and its circuits have to be operated. The ignition switch in this case is moved from its first or inoperative position into its second position in which it makes contact with contact 11, a current now passes from ground 9 to switch 10, contact 11, conductor 65, contacts 63, contact disk 60, contact 64, conductor 42, terminal 41 to the winding of solenoid 16 and through conductor 44 to terminal 39 connected with battery 35. The solenoid 16 is thus energized and attracts its core 18 and therefore retracts plunger rod 19 connected with the core.

The disk 20 now comes into contact with the two contact members 30, 31 and connects the battery 35 with the load circuit 46 over the contact terminal 31 which, as above mentioned, is now connected with contact 30 through disk 20 and to the battery 35 by means of conductor 38 leading to contact terminal 33. The springs 24 and 25 are compressed and the plunger rod 19 has been withdrawn by the solenoid into the interior thus permitting again a movement of the locking plate 69 under the action of springs 58, 57 pressing on rod 52. The outward movement of locking plate 69 covers the opening 71 in the perforated plate 70 and therefore locks the plunger rod 19 in its position. The car is now in operative condition and remains in such condition also if the ignition switch 10 is returned to its normal position indicated at 14. Upon moving the ignition switch into its normal position the current through winding of the solenoid 16 is interrupted but the switching device 15 remains in its position as it is locked by the locking plate 69. The device does not consume power during operation as the solenoid 48 has been cut out and the circuit of solenoid 16 is interrupted at contacts 63, 64.

If it is desired to throw the master switch into its inoperative or "off" position the ignition switch 10 is moved from its normal position indicated at 14 towards contact 12. A current then flows through solenoid 48 from ground 9 over ignition switch 10, contact 12, conductor 66, solenoid winding 48, terminal 53, conductor 36, contact terminal 31, contact disk 20, contact member 30, battery 35 to ground 100. The winding of the solenoid 48 attracts the core 51 and therefore moves plunger rod 52 inwardly, withdrawing the support from head 49 of plunger rod 19. The hole 71 in the perforated plate 70 is therefore again uncovered and the plunger rod 19 under the action of springs 24, 25 moves outwardly; the disk 20 now contacts the contact members 32, and 33 and breaks contact with contact members 30, 31.

This grounds the conductor 36 so that the plunger 50 is no longer attracted by the solenoid but the plunger rod 52 cannot move outwardly under the action of springs 57, 58 because the locking plate 69 is held by the plunger rod 19. The situation shown in Figure 2 of the drawing is therefore restored. The load circuits are all grounded and current is cut off from winding 48 by its connection with ground 37.

It will thus be seen that the above invention provides a safety switch which is operable by the ignition switch by electrical means and which may be locked in its position without requiring electrical energy for maintaining the switch in its locking position.

It will also be understood that the foregoing description introduces a number of specific details which are not indispensable for carrying the principle of the invention into effect and therefore a change in these unessential details does not constitute a departure from the essence of the invention as defined in the annexed claims.

Having described the invention, what is claimed as new is:

1. A safety device controlling the connection between a source of current and the depending current excited elements of a system, said system including a manually operated control switch, said safety device comprising a solenoid operated switching device including a solenoid, a plunger provided with a solenoid core operated by said solenoid, and with a plunger rod attached to said core, spring means moving said plunger rod in a direction opposed to the direction of movement of the core upon energization of the solenoid, a first pair of contacts connected with said source of current and with the elements of the system and a solenoid operated locking device respectively, a movable contact carried and operated by said plunger rod connecting said first pair of contacts when the solenoid is energized, a second pair of contacts connected to ground and to said solenoid operated locking device and said elements of said system respectively, means continuously urging said movable contact to engage said second pair of contacts, a solenoid operated locking device having a solenoid and being arranged adjacent to the switching device and provided with a plunger rod substantially at right angles to the plunger rod of the switching device and a movable contact carried and operated by said plunger rod of the locking device, and with spring means for moving the plunger rod of the locking device in one direction, the said locking device being further provided with a locking plate attached to said plunger rod of the locking device and adapted to be moved into the path of the plunger rod of the switching device for locking the same into its operative position, energizing circuits for each of said solenoid operated devices interlocking the operation of said devices so as to automatically lock when brought into operative position, said energizing circuits including one pair of contacts connected to said solenoid operated switching device and to one terminal of said manually operated switch, respectively, another pair of contacts connected to another terminal of said manually operated switch and to the solenoid of said solenoid operated switching device, said energizing circuits being controlled and alternatively closed by the manually operated switch selectively contacting one of said terminals, the energization of said locking device unlocking the switching device for return into its inoperative position.

2. A safety device controlling the connection between a source of current and the depending current excited elements of a system, said system including a manually operated control switch, said safety device comprising a solenoid operated switching device including a solenoid, a plunger provided with a solenoid core operated by said solenoid, and with a plunger rod in a direction opposed to the direction of movement of the core upon energization of the solenoid, a first pair of contacts connected with said source of current and with the elements of the system and a solenoid operated locking device respectively, a movable contact carried and operated by said plunger rod connecting said first pair of contacts when the solenoid is energized, a second pair of contacts connected to ground and to said solenoid operated locking device and said elements of said system respectively, means continuously urging said movable contact to engage said second pair of contacts, a solenoid operated locking device having a solenoid and being arranged adjacent to the switching device and provided with a plunger rod substantially at right angles to the plunger rod of the switching device and a movable contact carried and operated by said plunger rod of the locking device, and with spring means for moving the plunger rod of the locking device in one direction, the said locking device being further provided with a locking plate attached to said plunger rod of the locking device and adapted to be moved into the path of the plunger rod of the switching device for locking the same into its operative position, energizing circuits for each of said solenoid operated devices interlocking the operation of said devices so as to automatically lock when brought into operative position, said energizing circuits including one pair of contacts connected to said solenoid operated switching device and to one terminal of said manually operated switch, respectively, another pair of contacts connected to another terminal of said manually operated switch and to the solenoid of said solenoid operated switch device, said energizing circuits being controlled and alternatively closed by the manually operated switch selectively contacting one of said terminals, the energization of said locking device unlocking the switching device for return into its inoperative position, a first plate having an aperture therethrough, said plunger rod selectively passing through said plate when said solenoid of the solenoid operated switching device is not excited, a second plate carried by said plunger rod of the solenoid actuated locking device, said second plate being so positioned as to cover the aperture in the first plate when said solenoid of the solenoid actuated locking device is not actuated to thus prevent the plunger rod of said solenoid actuated switching device from passing into said aperture, the current consumption of the safety device being thus limited to the period of change of said movable contacts.

VERNON H. HAY.
WYATT J. ARMFIELD.

REFERENCES CITED

The following references are of record in the file of this patent:

UNITED STATES PATENTS

| Number | Name | Date |
| --- | --- | --- |
| 1,176,202 | Cheney | Mar. 21, 1916 |
| 1,564,815 | Ballance | Dec. 8, 1925 |
| 2,221,604 | Peterson | Nov. 12, 1940 |
| 2,453,267 | Rossmann | Nov. 9, 1948 |